United States Patent
Van Hensbergen (10) Patent No.: US 9,830,334 B2
(45) Date of Patent: Nov. 28, 2017

(54) CLIENT TO CLIENT RESOURCE SHARING IN A CLIENT-SERVER FILE-SYSTEM

(75) Inventor: Eric Van Hensbergen, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 420 days.

(21) Appl. No.: 13/606,845

(22) Filed: Sep. 7, 2012

(65) Prior Publication Data

US 2014/0074898 A1    Mar. 13, 2014

(51) Int. Cl.
*G06F 17/30* (2006.01)

(52) U.S. Cl.
CPC ............................. *G06F 17/30203* (2013.01)

(58) Field of Classification Search
CPC ........................... G06F 17/30067; H04L 67/06
USPC .................................................... 707/827
See application file for complete search history.

(56) References Cited

U.S. PATENT DOCUMENTS

| | | | |
|---|---|---|---|
| 7,284,030 B2 | 10/2007 | Ackaouy et al. | |
| 7,389,298 B2 | 6/2008 | Brown et al. | |
| 7,475,077 B2 | 1/2009 | Burnett et al. | |
| 7,734,951 B1 | 6/2010 | Balasubramanian et al. | |
| 7,877,511 B1* | 1/2011 | Berger et al. | 709/242 |
| 7,958,167 B2 | 6/2011 | Diaconu et al. | |
| 8,078,622 B2 | 12/2011 | Rabii et al. | |
| 2003/0084162 A1* | 5/2003 | Johnson et al. | 709/227 |
| 2006/0155785 A1* | 7/2006 | Berry et al. | 707/204 |
| 2006/0271686 A1* | 11/2006 | Sekaran | 709/227 |
| 2009/0106255 A1 | 4/2009 | Lacapra et al. | |
| 2010/0145917 A1 | 6/2010 | Bone et al. | |
| 2012/0166483 A1* | 6/2012 | Choudhary et al. | 707/770 |

* cited by examiner

*Primary Examiner* — Hung T Vy
(74) *Attorney, Agent, or Firm* — Garg Law Firm, PLLC; Rakesh Garg; Mercedes L. Hobson (57) ABSTRACT

A request is received from a first client, at a file-server, to use a handle available at the file-server, the handle corresponding to a resource available at a second client. A response message is selected, the selected response being specified in a file-system protocol. The request is multiplexed with the selected response. An identifier is added to the multiplexed response, the identifier associating a set of requests and responses between the first client and the second client concerning the resource. The multiplexed response is sent to the second client. A second response is received from the second client. Responsive to the request from the first client, and further responsive to the second response from the second client, a third response is sent to the first client, the third response enabling the client to client resource sharing in the client-server file-system.

20 Claims, 6 Drawing Sheets

CLIENT TO CLIENT RESOURCE SHARING IN A CLIENT-SERVER FILE-SYSTEM

BACKGROUND

1. Technical Field

The present invention relates generally to a method, system, and computer program product for an improved client-server file-system. More particularly, the present invention relates to a method, system, and computer program product for client to client resource sharing in a client-server file-system.

2. Description of the Related Art

A client-server file-system is a distributed file-system. In a client-server file-system, a client establishes a connection with a file-server to utilize the file-system resources and data available from the file-server. An existing distributed file-system protocol (file-system protocol) allows any number of clients to establish connections with the file-server and utilize the resources and data available from the file-server.

A file-server's resources include data files as well as synthetic files. A synthetic file is a file representation of a resource, such as a keyboard, a display device, a memory, an audio device, or other similar device or resource available at the file-server, and data related thereto. A synthetic file is also called a resource file. A data file is a collection of data organized according to a file structure. Some examples of data files are spreadsheets, text documents, source code files, binary files, and images.

A client can request a data file or a resource file from a file-server using the request response messages specified in the file-system protocol in use. For example, to use a resource of the file-server, a client can send a request to mount the file-server's resource at the client. The file-server can respond with a response message granting access to the file-server's resource.

SUMMARY

The illustrative embodiments provide a method, system, and computer program product for client to client resource sharing in a client-server file-system. An embodiment receives a request, from a first client in the client-server file-system, at a file-server in the client-server file-system, to use a handle available at the file-server, the handle corresponding to a resource available at a second client in the client-server file-system. The embodiment selects a response message, forming a selected response, to send to the second client, the selected response being specified in a file-system protocol established between the second client and the file-server. The embodiment multiplexes the request from the first client with the selected response, forming a multiplexed response to the second client. The embodiment adds an identifier to the multiplexed response directed to the second client, the identifier associating a set of requests and responses between the first client and the second client concerning the resource. The embodiment sends the multiplexed response to the second client. The embodiment receives, responsive to the multiplexed response, a second response from the second client. The embodiment sends, responsive to the request from the first client, and further responsive to the second response from the second client, a third response to the first client, the third response enabling the client to client resource sharing in the client-server file-system.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

The illustrative embodiments recognize that in presently available client-server file-systems, the network configuration is such that while the client(s) can initiate a connection to the file-server, the reverse is not true. In other words, presently, a client must initiate a connection in an existing client-server file-system. This limitation must be honored to comply with common configurations of firewalls, network address translation gateways, and multi-segment networks like the ones present on supercomputers. The illustrative embodiments further recognize that in a presently available client-server file-system, a client cannot establish a direct connection with another client. The illustrative embodiments recognize that emerging data-center networks and high performance computing networks use a plethora of transport protocols such that the only way to traverse those diverse protocols may be by using an application level protocol such as a client-server file system protocol.

The illustrative embodiments recognize that it is desirable to allow one client in a client-server file-system to share the client's resources with other clients in the client-server file-system. The illustrative embodiments recognize that presently available file-system protocols do not allow such client to client sharing of resources.

Additionally, presently, a resource can be shared only from a file-server to a client. The illustrative embodiments recognize that a client in a client-server file-system cannot share the client's resources with the file-server.

The illustrative embodiments used to describe the invention generally address and solve the above-described problems and other problems related to resource sharing in a client-server file-system. The illustrative embodiments provide a method, system, and computer program product for client to client resource sharing in a client-server file-system.

An embodiment allows a client system that is participating in a client-server file-system to export the client's file-system namespace to a file-server. A data processing system's file-system namespace identifies the resources available in the data processing system. Thus, the data processing system's file-system can include data files available at the data processing system as well as resource files corresponding to the devices and their related data available in the data processing system.

According to an embodiment, an export of a file-system namespace from one data processing system to another data processing system includes providing information about all or part of the file-system namespace to the other data processing system. The information is provided in such a manner that the other data processing system can mount the exported file-system namespace and use a resource identified in the exporting system's file-system, the other data processing system can share the exported file-system namespace with a third data processing system such that the third data processing system can mount the exported file-system namespace and use a resource identified in the exporting system's file-system, or both.

For example, a client data processing system may include a data file and a resource file in the client's file-system. An embodiment exports a portion of that file-system's namespace from the client to a file-server.

In one embodiment, the file-server mounts the client's exported file-system namespace and accesses the data file or the resource corresponding to the resource file. In another embodiment, the file-server makes the exported file-system namespace available to a second client connected to the file-server. The second client mounts the client's exported file-system namespace and accesses the data file or the resource corresponding to the resource file.

A file-system namespace itself can be a resource in a data processing system. An embodiment exports a client's file-system namespace by posting a handle to the resource at a file-server using an existing connection that is formed between the client and the server using an existing file-system protocol. A handle to a resource is a reference to the resource such that the resource can be accessed and used by using the handle. An embodiment posts the handle using an extension, such as a new message structure, to an existing file-system protocol.

A file-server (server) according to an embodiment includes mechanism to store the handle, and share the handle with other clients connected to the file-server over an existing file-system protocol. The file-server according to an embodiment further includes a component to receive a request from a first client to use a resource of a second client via a handle posted by the second client at the file-server.

The file-server of an embodiment further implements a reverse flow method for communicating the request from the second client to the first client, and receiving a response from the first client. In a client-server file-system, sending a request from a file-server to a client, and receiving a response at the file-server from the client, is a reverse flow according to an embodiment because, in a normal flow, a client has the request function and the file-server has the response function in the client-server file-system. An existing file-system protocol includes a set of request response messages that are configured according to the normal flow.

An embodiment multiplexes the request from the second client with a response message, the response message being a member of an existing file-system protocol's normal flow. The reverse flow according to an embodiment sends the multiplexed response, which includes the request from the second client, to the first client using an existing connection between the file-server and the first client. The reverse flow appears as normal flow in the connection because the multiplexed response appears as a response in the normal direction—from the file-server to the first client.

An embodiment at the first client prepares a response to the request from the second client. The embodiment sends the response to the file-server, allowing access to the first client's resource to the second client.

An embodiment at the file-server communicates the response to the second client using an existing connection between the file-server and the second client in a normal flow according to an existing file-system protocol.

The illustrative embodiments are described with respect to certain resources only as examples. Such descriptions are not intended to be limiting on the invention. For example, an illustrative embodiment can be implemented with respect to a device or a data file resource in a similar manner within the scope of the illustrative embodiments.

The illustrative embodiments are described with respect to certain data, data structures, file-systems, file names, directories, and paths only as examples. Such descriptions are not intended to be limiting on the invention. For example, an illustrative embodiment described with respect to a local application name and path can be implemented as an application on a remote path within the scope of the invention.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting on the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 1:
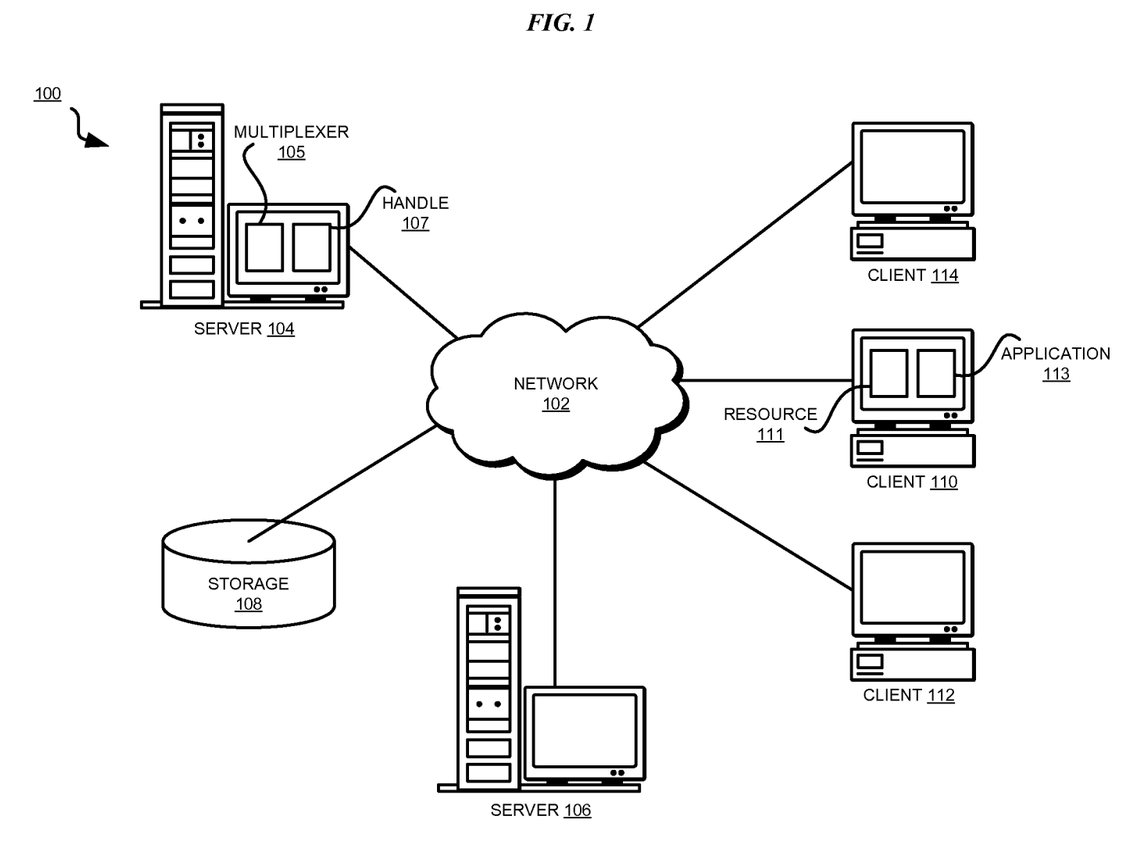
FIG. 1 depicts a pictorial representation of a network of data processing systems in which illustrative embodiments may be implemented.
Figure 2:
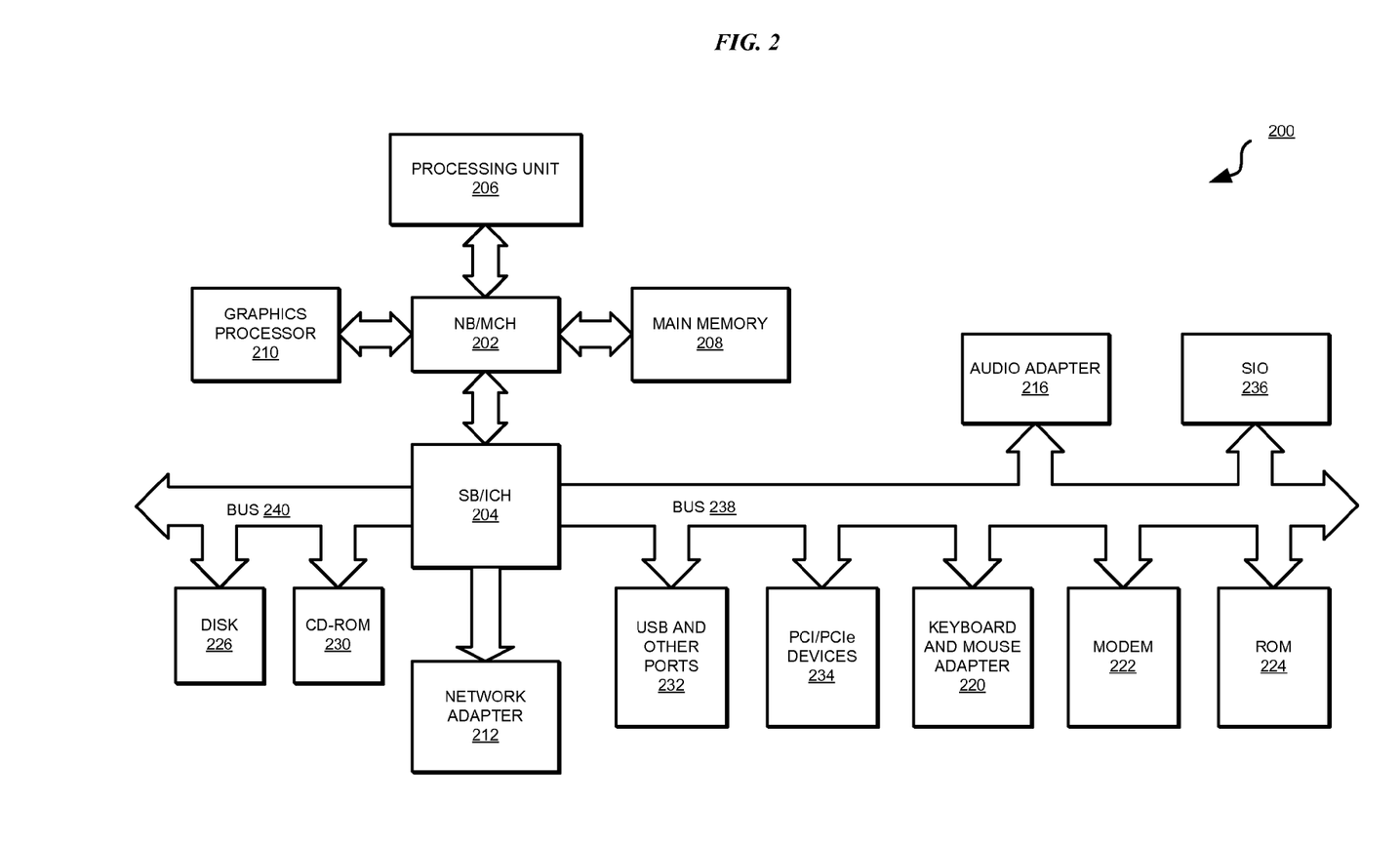
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that can be used in an embodiment. For example, server 104, may include multiplexer component 105 that may be used in an embodiment. Client 110 includes resource 111 and application 113. Resource 111 can be any resource contemplated within this disclosure. Application 113 implements an embodiment described herein. Server 104 includes handle 107, which client 110 posts corresponding to resource 111 using an embodiment.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive 226, CD-ROM 230, and other similarly usable devices are some examples of computer usable storage devices including computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as multiplexer 105 and application 113 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
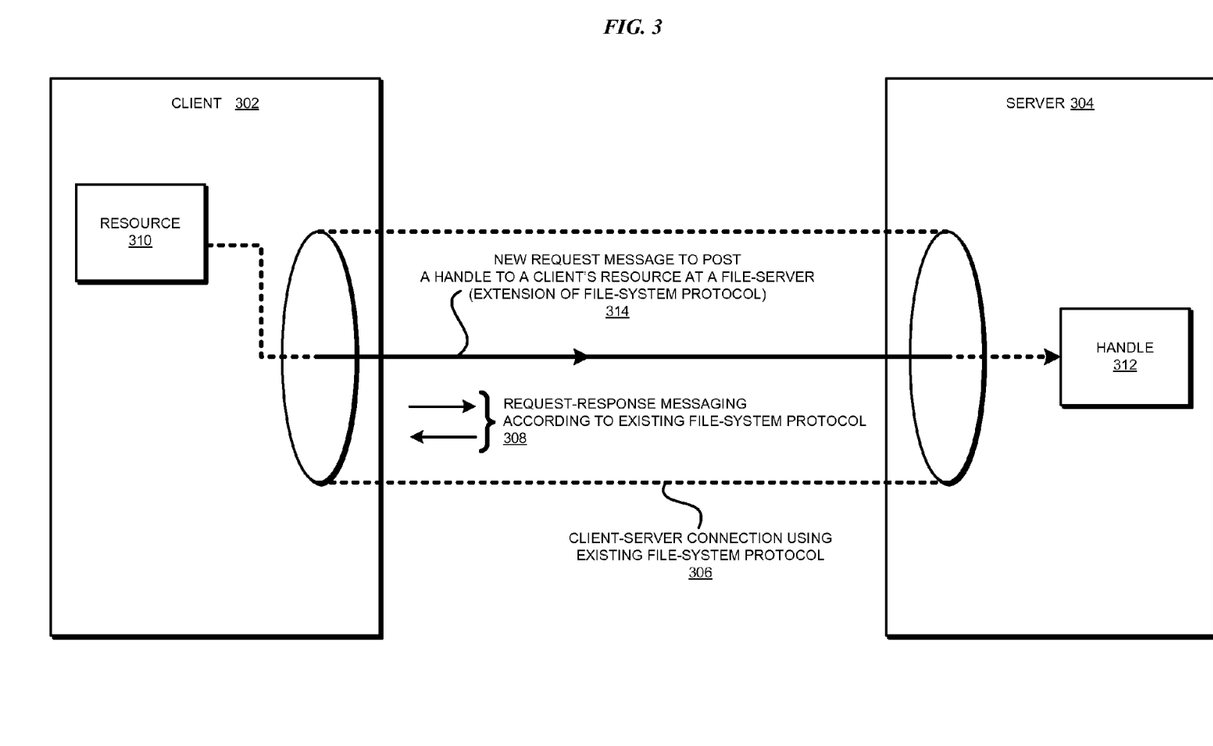
FIG. 3 depicts a block diagram of an example configuration to post a resource handle from a client to a file-server in a client-server file-system in accordance with an illustrative embodiment.

With reference to FIG. 3, this figure depicts a block diagram of an example configuration to post a resource handle from a client to a file-server in a client-server file-system in accordance with an illustrative embodiment. Client 302 can be used as client 110 in FIG. 1, server 304 is usable as server 104 in FIG. 1.

Client 302 communicates with server 304 over client-server connection 306 that is formed using an existing file-system protocol. The existing file system protocol specifies request-response messaging 308 according to a set of request and response messages for normal flow via connection 306.

Client 302 includes resource 310, which client 302 posts at server 304 as handle 312. Particularly, for posting handle 312, client 302 constructs and sends new request message 314 to server 304. New request message 314 is an addition to or an extension of the existing file-system protocol using which client 302 and server 304 communicate over connection 306.

An application in client 302 (not shown), such as application 113 in FIG. 1, constructs new request message 314. The flow of new request message 314 is a normal flow through connection 306.

Figure 4:
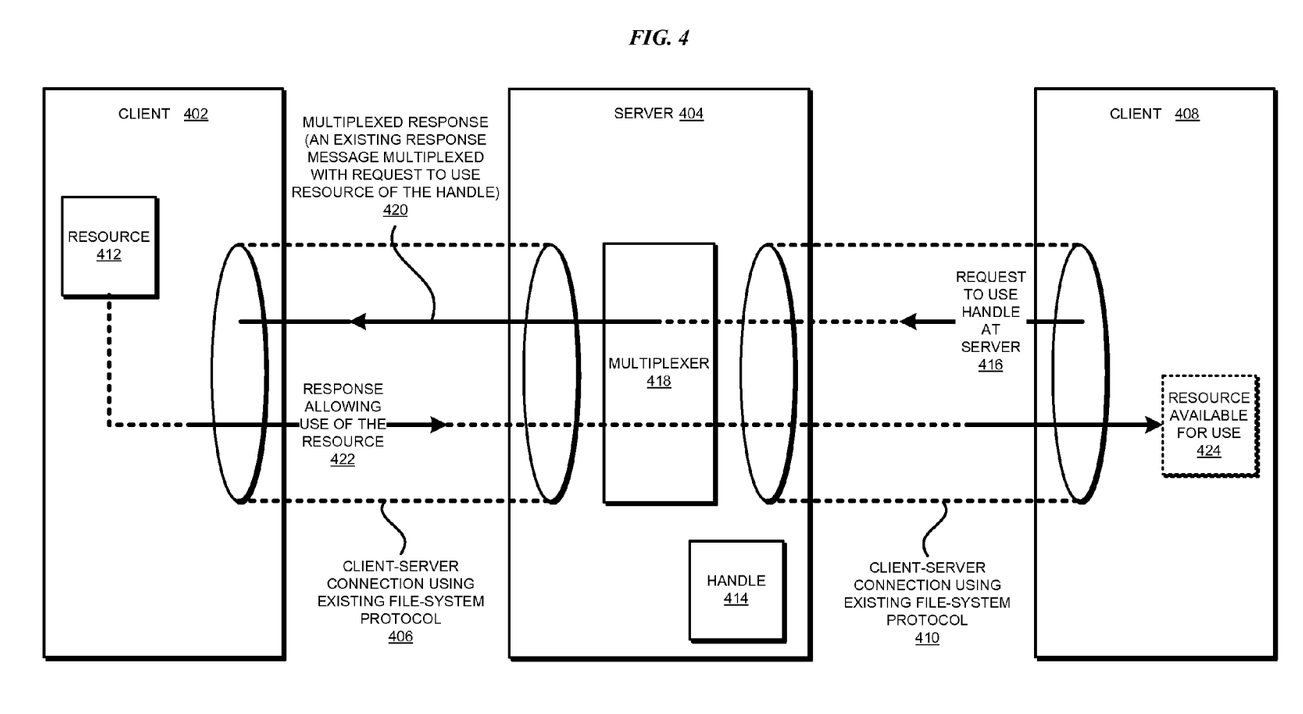
FIG. 4 depicts an example configuration for client to client resource sharing in a client-server file-system in accordance with an illustrative embodiment.

With reference to FIG. 4, this figure depicts an example configuration for client to client resource sharing in a client-server file-system in accordance with an illustrative embodiment. Client 402, server 404, and client-server connection 406 are analogous to client 302, server 304, and connection 306, respectively, in FIG. 3.

Client 408 is analogous to client 112 in FIG. 1. Client 408 is in communication with server 404 using client-server connection 410, which is formed using an existing file system protocol. Note that the file system protocols used for connections 406 and 410 need not be identical. Server 404 can include a protocol conversion component (not shown) to facilitate file-system communication across multiple file-system protocols.

Client 402 includes resource 412 and posts handle 414 at server 404 in the manner described with respect to FIG. 3. Once client 402 posts handle 414, handle 414 is available to client 408 just as any other resource of server 404 is available for sharing with client 408.

Client 408 sends request 416 to use handle 414 at server 404. Request 416 is a normal flow request specified in the file-system protocol used for connection 410.

When request 416 arrives at server 404, a component in server 404 detects that request 416 is requesting the use of resource 412 at client 402. In one embodiment, multiplexer 418 includes this detection functionality. In another embodiment, this detection function can be implemented as a separate component (not shown) in server 404.

Multiplexer 418 combines (multiplexes) a suitable normal flow response message specified in the file-system protocol used for connection 406 with request 416 to form multiplexed response 420. Multiplexed response flows in a normal flow from server 404 to client 402. If needed in a particular implementation, the multiplexing function at multiplexer 418 can include protocol translation, so that request 416 according to one file system protocol can be combined with a normal flow response from another file-system protocol to form multiplexed response 420.

Client 402 receives multiplexed response 420, such as, for example, at an application (not shown) executing in client 402. Client 402 determines that multiplexed response 420 includes a request from client 408, requesting the use of resource 412 at client 402.

Client 402 sends response 422 in reverse flow to server 404, allowing client 408 the use of resource 412 via handle 414. Server 404 communicates response 422, or a translated or modified version thereof, to client 408. Client 408 mounts resource 412 as resource 424, which becomes available for use at client 408. Thus, this example configuration accomplishes client to client resource sharing in a client-server file-system.

Figure 5:
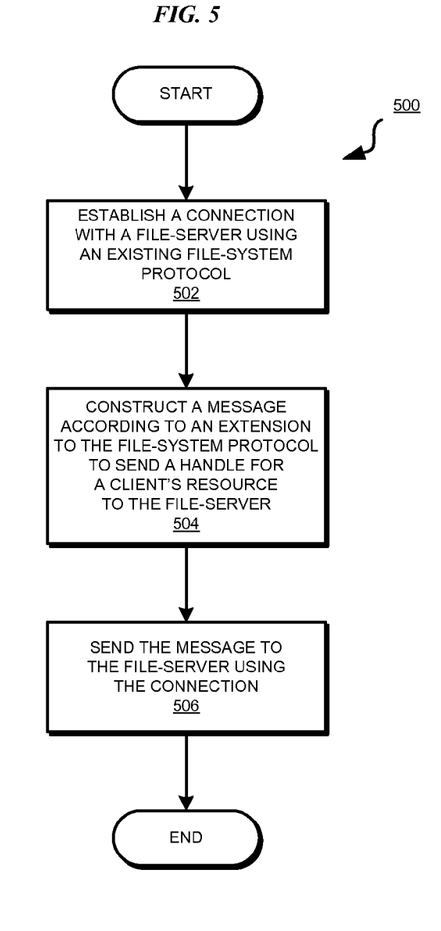
FIG. 5 depicts a flowchart of an example process of posting a client's resource at a file-server for sharing with other clients in a client-server file-system in accordance with an illustrative embodiment.

With reference to FIG. 5, this figure depicts a flowchart of an example process of posting a client's resource at a file-server for sharing with other clients in a client-server file-system in accordance with an illustrative embodiment. Process 500 can be implemented in application 113 in FIG. 1, an existing application to facilitate client-server file-system communications, or a combination thereof.

Process 500 begins by establishing a connection with a file-server using an existing file-system protocol (step 502). Process 500 constructs a message according to an extension to the file-system protocol to send a handle for a client resource to the file-server (step 504). Process 500 sends the message to the file-server using the connection (step 506). Process 500 ends thereafter.

Figure 6:
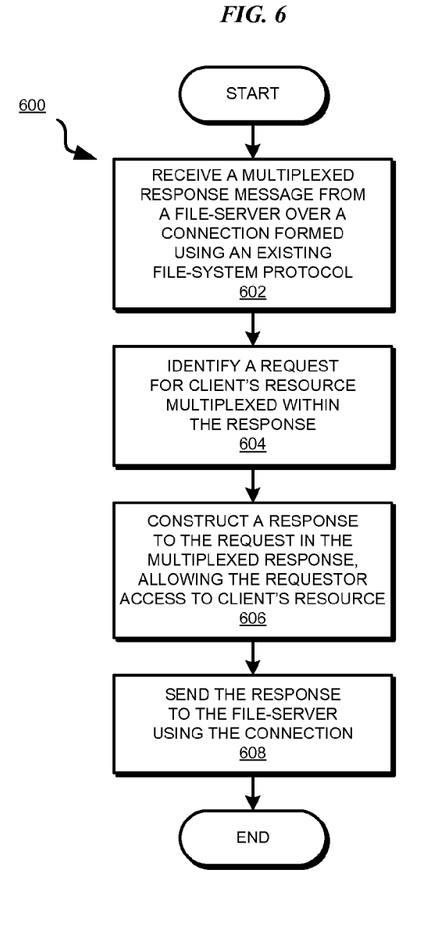
FIG. 6 depicts a flowchart of an example process of a client sharing a client resource with another client in a client-server file-system in accordance with an illustrative embodiment.

With reference to FIG. 6, this figure depicts a flowchart of an example process of a client sharing a client resource with another client in a client-server file-system in accordance with an illustrative embodiment. Process 600 can be implemented in application 113 in FIG. 1, an existing application to facilitate client-server file-system communications, or a combination thereof.

Process 600 begins by receiving a multiplexed response from a file-server (step 602). The multiplexed response of step 602 is received at a first client using a connection formed between the client and the file-server using an existing file-system protocol.

Process 600 identifies a request for a client resource of the first client, the request being multiplexed with a response specified by the file-system protocol (step 604). Process 600 constructs a response to the request included in the multiplexed response (step 606). The constructed response allows a second client in the client-server file-system access to the client resource being requested from the first client in the client-server file-system. Process 600 sends the response to the file-server using the connection formed in step 502 in FIG. 5. Process 600 ends thereafter.

Figure 7:
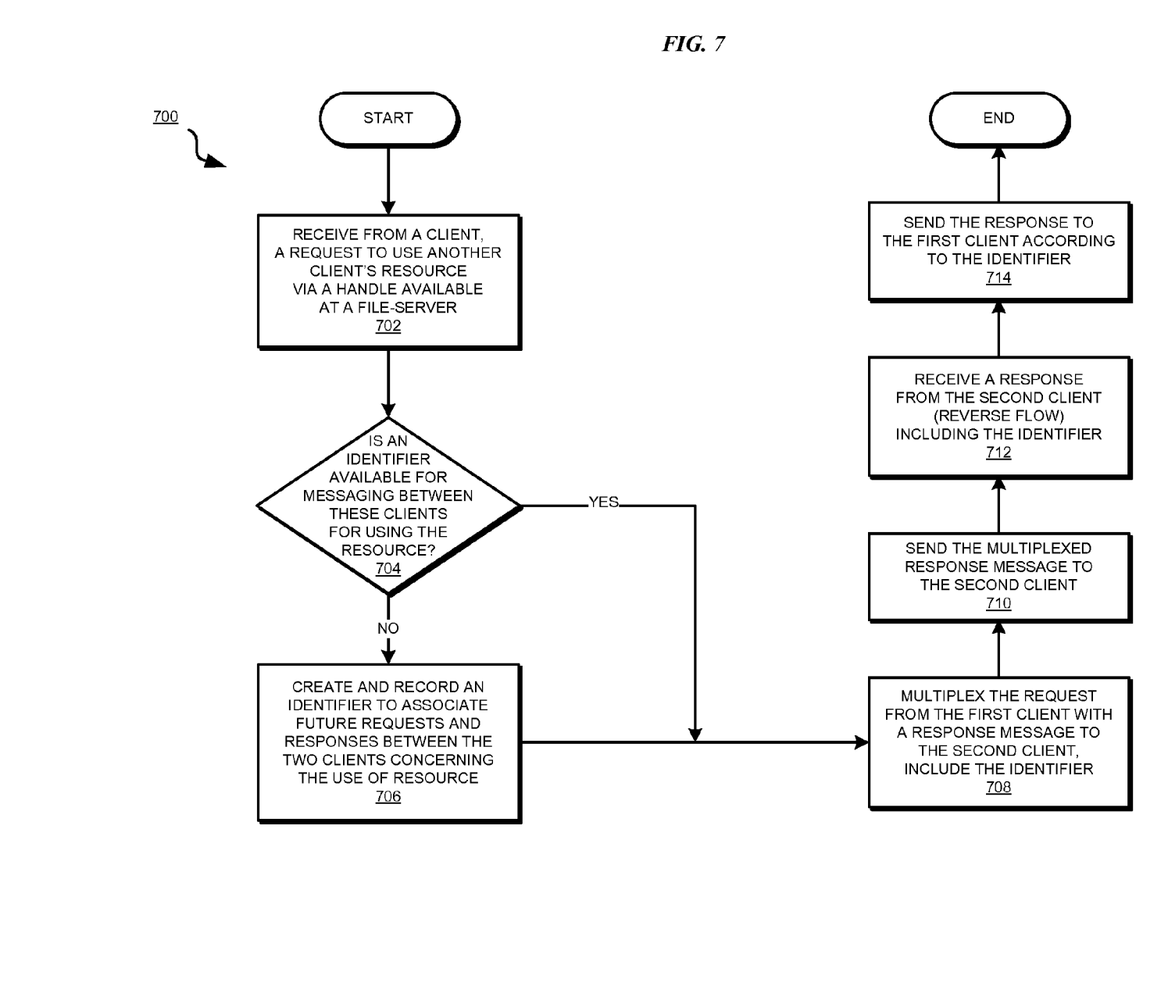
FIG. 7 depicts a flowchart of an example process for enabling client to client resource sharing in a client-server file-system in accordance with an illustrative embodiment.

With reference to FIG. 7, this figure depicts a flowchart of an example process for enabling client to client resource sharing in a client-server file-system in accordance with an illustrative embodiment. Process 700 can be implemented in a file-server, such as in multiplexer 418 of server 404 in FIG. 4, another application (not shown) executing in server 404 in FIG. 4, or a combination thereof.

Process 700 begins by receiving, from a client in a client-server file-system, a request to use a resource from another client in the client-server file-system via a handle for the resource, the handle being available at the file-server (step 702). Process 700 determines whether an identifier is available for messaging between the two clients for using the resource (step 704).

If no identifier is as yet established for coordinating the requests and responses concerning the client resource between the two clients ("No" path of step 704), process 700 creates and records an identifier to associate future requests and responses between the two clients concerning the use of the client resource (step 706). Process 700 then proceeds to step 708. If such an identifier has previously been established ("Yes" path of step 704), process 700 proceeds to step 708.

Process 700 multiplexes the request from the first client with a response message to the second client (step 708). The second client is the client offering the client resource for sharing with other clients in the client-server file-system. The first client is the client in the client-server file-system that is requesting the use of the second client's shared client resource. The identifier established previously or at step 706 is also included in the multiplexed response formed in step 708. Process 700 sends the multiplexed response message to the second client (step 710).

Process 700 receives a response, in response to the multiplexed response, from the second client, as a reverse flow (step 712). The response in the reverse flow includes the identifier and allows the first client to access the client resource at the second client (step 714). Process 700 sends the response from the reverse flow, or some translated or modified form thereof, to the second client (step 714). Process 700 ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for client to client resource sharing in a client-server file-system. Using an embodiment, a client in a client-server file-system can share a client resource with other clients in the client-server file-system. An embodiment provides light-weight mechanism to post the client resource at the file-server in the client-server file-system using an extension of the file-system protocol. The messaging for client to client resource sharing according to an embodiment uses connections between clients and file-server using existing file-system protocols.

An embodiment does not require the client that shares the client resource to operate as a server, or even execute a portion of a server code. An embodiment does not require a file server to cache the resource file, thereby enabling client to client resource sharing in a client-server file-system without the latency associated with resources cached at the file-server.

Furthermore, an embodiment avoids double marshalling and un-marshalling of the shared resource. For example, an embodiment avoids having to mount the client resource as a server resource first, then share the server resource with other clients in the client-server file-system.

The embodiments describe processes by which a client allows its client resource to be used by another client in the client-server file-system. The embodiments omit the processes by which the first client could decline the use of the client resource by the second client in the client-server file-system. With the benefit of this disclosure, those of ordinary skill in the art will be able to conceive many ways in which such declining can be implemented, and the same are contemplated within the scope of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device. The terms "computer-readable tangible storage device," "computer readable storage device," and computer-readable storage device" do not encompass a signal propagation medium such as a copper cable, optical fiber, or wireless transmission medium, any description in this disclosure to the contrary notwithstanding.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A computer implemented method for client to client resource sharing in a client-server file-system, the method comprising:

receiving, from a first client in the client-server file-system, at a file-server in the client-server file-system, a request to use a handle available at the file-server, the handle corresponding to a resource at a second client in the client-server file-system, wherein the second client is distinct from the first client, the second client is distinct from the file-server, the second client is distinct from the resource, a protocol to reach the second client is distinct from a protocol of the handle to reach the resource, and the file-server file-system does not include the resource;

selecting a response message, forming a selected response, to send to the second client, the selected response being specified in a file-system protocol established between the second client and the file-server, wherein a connection established between the second client and the server allows a normal flow of messages and a reverse flow of messages, and where the server sending the selected response to the second client is according to the normal flow of messages;

multiplexing the request from the first client with the selected response, forming a multiplexed response to the second client;

adding an identifier to the multiplexed response directed to the second client, the identifier associating a set of requests and responses between the first client and the second client concerning the resource;

sending the multiplexed response to the second client;

receiving, responsive to the multiplexed response, a second response from the second client; and sending, responsive to the request from the first client, and further responsive to the second response from the second client, a third response to the first client, the third response enabling the client to client resource sharing in the client-server file-system.

2. The computer implemented method of claim 1, wherein the file-server cannot initiate a connection with a client in the client-server file-system, wherein each of the first client and the second client initiates a first and a second connection respectively with the file-server, and wherein the first client cannot establish a direct connection with the second client in the client-server file-system, further comprising:

receiving a post message from the second client to post the handle at the file-server.

3. The computer implemented method of claim 2, wherein the post message is an export of a part of a file-system namespace of the second client.

4. The computer implemented method of claim 1, wherein the request from the first client conforms to a different file-system protocol, wherein the multiplexing comprises:

modifying the request from the different file-system protocol to conform the file-system protocol, to form a modified request from the first client; and combining the modified request from the first client with the selected response.

5. The computer implemented method of claim 1, further comprising:

creating the identifier.

6. The computer implemented method of claim 5, wherein the creating occurs responsive to the receiving the request to use the handle from the first client.

7. The computer implemented method of claim 1, wherein the second response forms the reverse flow between the second client and the file-server, and wherein the reverse flow utilizes the connection already established between the second client and the file-server according to the file-system protocol.

8. The computer implemented method of claim 1, wherein the sending the third response allows the first client to use the resource of the second client.

9. The computer implemented method of claim 1, wherein the sending the third response declines a use of the resource of the second client by the first client.

10. The computer implemented method of claim 1, wherein the third response to the first client conforms to a different file-system protocol, wherein the sending the third response further comprises:

modifying the second response from the file-system protocol to conform the different file-system protocol, forming the third response.

11. A computer usable program product comprising a computer usable storage device including computer usable code for client to client resource sharing in a client-server file-system, the computer usable code comprising:

computer usable code for receiving, from a first client in the client-server file-system, at a file-server in the client-server file-system, a request to use a handle available at the file-server, the handle corresponding to a resource at a second client in the client-server file-system, wherein the second client is distinct from the first client, the second client is distinct from the file-server, the second client is distinct from the resource, a protocol to reach the second client is distinct from a protocol of the handle to reach the resource, and the file-server file-system does not include the resource;

computer usable code for selecting a response message, forming a selected response, to send to the second client, the selected response being specified in a file-system protocol established between the second client and the file-server, wherein a connection established between the second client and the server allows a normal flow of messages and a reverse flow of messages, and where the server sending the selected response to the second client is according to the normal flow of messages;

computer usable code for multiplexing the request from the first client with the selected response, forming a multiplexed response to the second client;

computer usable code for adding an identifier to the multiplexed response directed to the second client, the identifier associating a set of requests and responses between the first client and the second client concerning the resource;

computer usable code for sending the multiplexed response to the second client;

computer usable code for receiving, responsive to the multiplexed response, a second response from the second client; and computer usable code for sending, responsive to the request from the first client, and further responsive to the second response from the second client, a third response to the first client, the third response enabling the client to client resource sharing in the client-server file-system.

12. The computer usable program product of claim 11, wherein the file-server cannot initiate a connection with a client in the client-server file-system, wherein each of the first client and the second client initiates a first and a second connection respectively with the file-server, and wherein the first client cannot establish a direct connection with the second client in the client-server file-system, further comprising:

computer usable code for receiving a post message from the second client to post the handle at the file-server.

13. The computer usable program product of claim 12, wherein the post message is an export of a part of a file-system namespace of the second client.

14. The computer usable program product of claim 11, wherein the request from the first client conforms to a different file-system protocol, wherein the multiplexing comprises:

computer usable code for modifying the request from the different file-system protocol to conform the file-system protocol, to form a modified request from the first client; and computer usable code for combining the modified request from the first client with the selected response.

15. The computer usable program product of claim 11, further comprising:

computer usable code for creating the identifier.

16. The computer usable program product of claim 15, wherein the creating occurs responsive to the receiving the request to use the handle from the first client.

17. The computer usable program product of claim 11, wherein the second response forms the reverse flow between the second client and the file-server, and wherein the reverse flow utilizes the connection already established between the second client and the file-server according to the file-system protocol.

18. The computer usable program product of claim 11, wherein the computer usable code is stored in a computer readable storage device in a data processing system, and wherein the computer usable code is transferred over a network from a remote data processing system.

19. The computer usable program product of claim 11, wherein the computer usable code is stored in a computer readable storage device in a server data processing system, and wherein the computer usable code is downloaded over a network to a remote data processing system for use in a computer readable storage device associated with the remote data processing system.

20. A data processing system for client to client resource sharing in a client-server file-system, the data processing system comprising:

a storage device including a storage medium, wherein the storage device stores computer usable program code; and a processor, wherein the processor executes the computer usable program code, and wherein the computer usable program code comprises:

computer usable code for receiving, from a first client in the client-server file-system, at a file-server in the client-server file-system, a request to use a handle available at the file-server, the handle corresponding to a resource at a second client in the client-server file-system, wherein the second client is distinct from the first client, the second client is distinct from the file-server, the second client is distinct from the resource, a protocol to reach the second client is distinct from a protocol of the handle to reach the resource, and the file-server file-system does not include the resource;

computer usable code for selecting a response message, forming a selected response, to send to the second client, the selected response being specified in a file-system protocol established between the second client and the file-server, wherein a connection established between the second client and the server allows a normal flow of messages and a reverse flow of messages, and where the server sending the selected response to the second client is according to the normal flow of messages;

computer usable code for multiplexing the request from the first client with the selected response, forming a multiplexed response to the second client;

computer usable code for adding an identifier to the multiplexed response directed to the second client, the identifier associating a set of requests and responses between the first client and the second client concerning the resource;

computer usable code for sending the multiplexed response to the second client;

computer usable code for receiving, responsive to the multiplexed response, a second response from the second client; and computer usable code for sending, responsive to the request from the first client, and further responsive to the second response from the second client, a third response to the first client, the third response enabling the client to client resource sharing in the client-server file-system.

* * * * *